UNITED STATES PATENT OFFICE.

HARRY P. BASSETT, OF CATONSVILLE, MARYLAND, ASSIGNOR TO THE SPAR CHEMICAL COMPANY, OF BALTIMORE, MARYLAND, A CORPORATION OF MARYLAND.

PROCESS OF PRODUCING A POTASSIUM SALT FROM INSOLUBLE SILICATES.

1,194,464.      Specification of Letters Patent.      Patented Aug. 15, 1916.

No Drawing.      Application filed March 8, 1915. Serial No. 12,933.

*To all whom it may concern:*

Be it known that I, HARRY P. BASSETT, a citizen of the United States, residing at Catonsville, in the county of Baltimore and State of Maryland, have invented certain new and useful Improvements in Processes of Producing a Potassium Salt from Insoluble Silicates, of which the following is a specification.

This invention relates to the production or recovery of soluble potassium salts from insoluble potassium containing material and particularly insoluble naturally occurring silicates such as feldspathic rock, green sand marl and the like, and has particular reference to certain improvements in processes of decomposing potassium containing alkali metal silicates containing potassium in an insoluble form by the action of sodium acid sulfate.

In processes of decomposing normally insoluble potassium containing silicates, by the action of sodium acid sulfate, sulfuric acid or more properly sulfur trioxid is produced and this sulfuric acid or sulfur trioxid is an important functioning reagent in the decomposition of the silicate under treatment. The action of the sulfuric acid or sulfur trioxid is not as energetic, lasting or satisfactory as is to be desired and it is an important object of this invention to overcome this disadvantage.

I have discovered that if a relatively small amount of a fluorid, such for example as hydrogen fluorid, an alkali metal fluorid, or an alkaline earth metal fluorid be added to the mixture of insoluble silicate and sodium acid sulfate, the yield of soluble potassium containing material is very greatly increased. I have discovered that the fluorid acts as a catalyzer or potential catalyzer, hereinafter termed a catalyzer, causing the sulfur trioxid to react in a more energetic, lasting and satisfactory manner, in effecting the decomposition of the silicate under treatment.

It is to be understood therefore, that an important object of my invention is to subject insoluble silicates of the character hereinbefore referred to to the action of a decomposable sulfate, preferably sodium acid sulfate, in the presence of a catalyzer and that such catalyzer increases and improves the action of the sulfur trioxid produced, in the decomposition of the alkali sulfate.

Other objects and advantages of the invention will be apparent in the course of the following specification.

In the preferred practice of my process I employ green marl sand (glauconite) although finely divided feldspar may be advantageously used. I prefer to grind the material to pass through a twenty mesh sieve, but may grind it still finer if desired. The insoluble potassium containing silicate is then mixed with sodium acid sulfate in any desired proportions, although I greatly prefer to mix the insoluble silicate with a materially smaller amount by weight of the acid sulfate, preferably approximately one-half by weight of the acid sulfate. To this I may advantageously add from 1 to 3 per cent. of a reducing agent such for example as coke. The catalyzing agent referred to is employed in an amount depending upon the particular compound used. If sodium fluorid is used it is employed in about the proportions of 1/30 parts by weight of the mixture, while if calcium fluorid is used, I employ approximately twice as much of the fluorid salt.

In the practice of my process I have obtained the most satisfactory results by mixing the reagents in the following proportions by weight: potassium containing silicate 2,000 pounds, sodium acid sulfate 1,000 pounds, sodium fluorid 100 pounds. The mixture is then heated to a reacting temperature preferably by being furnaced in a tube furnace or the like, at a red heat, the preferred temperature being approximately from 900° to 1000° F. When no reducing agent is added to the mixture, it is sometimes advantageous to furnace such mixture in the presence of a reducing flame, so that the reaction takes place in the presence of a reducing agent. After heating the mixture to a reacting temperature the resulting fused mass is allowed to cool and it is then leached with water. The leaching operation results in the production of a solution containing sodium and potassium sulfates which may be separated by any suitable process, such for example as my process described and claimed in Patent No. 1,091,633, granted March 24, 1914.

In some cases, I have obtained improved results by adding water to the mixture before furnacing it, and in such case I preferably add from 20 to 25 per cent. by weight of water with respect to the mixture.

While I have described in detail the preferred embodiment of my process and the proportions of ingredients, it is to be understood that the details of procedure may be altered, the proportions of ingredients varied, and that known chemical equivalents may be employed without departing from the spirit of my invention or the scope of the subjoined claims.

Having described my invention, I claim:—

1. The process which consists in furnacing at a red heat a mixture of an insoluble potassium containing silicate, a body containing the radical $SO_3$ and a body capable of acting catalytically with respect to such $SO_3$.

2. The process which consists in furnacing at a red heat a mixture of an insoluble potassium containing silicate, sodium acid sulfate and a catalyzer.

3. The process which consists in furnacing at a red heat a mixture of an insoluble potassium containing silicate, a sulfate, and a catalyzer adapted to increase the action of the sulfur trioxid produced upon the silicate.

4. The process which consists in furnacing at a red heat a mixture of an insoluble potassium containing silicate, a sulfate, and a fluorid.

5. The process which consists in furnacing at a red heat a mixture of an insoluble potassium containing silicate, sodium acid sulfate, and a fluorid.

6. The process which consists in furnacing at a red heat a mixture of an insoluble potassium containing silicate, sodium acid sulfate, and a metal fluorid.

7. The process which consists in furnacing at a red heat a mixture of an insoluble potassium containing silicate, a sulfate, and a body adapted to act catalytically with respect to sulfur trioxid, in the presence of a reducing agent.

8. The process which consists in furnacing at a red heat a mixture of an insoluble potassium containing silicate, sodium acid sulfate and a catalyzer, in the presence of a reducing agent.

9. The process which consists in furnacing at a red heat a mixture of an insoluble potassium containing silicate, sodium acid sulfate and a catalyzer, in the presence of a reducing agent and water.

10. The process which consists in furnacing at a red heat a mixture of an insoluble potassium containing silicate and approximately one-half the amount by weight of sodium acid sulfate in the presence of a relatively small amount of a metal fluorid.

In testimony whereof I affix my signature in presence of two witnesses.

HARRY P. BASSETT.

Witnesses:
Ph. H. Hoffman,
C. H. Slater.